United States Patent
Lamba et al.

(10) Patent No.: US 9,020,962 B2
(45) Date of Patent: Apr. 28, 2015

(54) INTEREST EXPANSION USING A TAXONOMY

(71) Applicants: Digvijay Singh Lamba, Sunnyvale, CA (US); Xiaoyong Chai, Mountain View, CA (US)

(72) Inventors: Digvijay Singh Lamba, Sunnyvale, CA (US); Xiaoyong Chai, Mountain View, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 91 days.

(21) Appl. No.: 13/650,077

(22) Filed: Oct. 11, 2012

(65) Prior Publication Data
US 2014/0108439 A1 Apr. 17, 2014

(51) Int. Cl.
G06F 17/30 (2006.01)

(52) U.S. Cl.
CPC ................. *G06F 17/30734* (2013.01)

(58) Field of Classification Search
CPC .......... G06F 17/30734; G06F 17/2785; G06F 17/3053; G06F 17/2795
USPC ........................................................ 707/758
See application file for complete search history.

(56) References Cited

U.S. PATENT DOCUMENTS

| | | | |
|---|---|---|---|
| 4,996,642 A | 2/1991 | Hey | |
| 5,749,081 A | 5/1998 | Whiteis | |
| 6,691,163 B1 | 2/2004 | Tufts | |
| 6,782,370 B1 | 8/2004 | Stack | |
| 7,680,703 B1 | 3/2010 | Smith | |
| 7,689,585 B2 * | 3/2010 | Zeng et al. | 707/999.104 |
| 8,078,615 B2 | 12/2011 | Smith | |
| 8,095,153 B2 | 1/2012 | Jenkins | |
| 8,200,683 B2 | 6/2012 | Gupta | |
| 8,285,602 B1 | 10/2012 | Yi | |
| 2001/0021914 A1 | 9/2001 | Jacobi | |
| 2001/0044810 A1 | 11/2001 | Timmons | |
| 2002/0016786 A1 | 2/2002 | Pitkow | |
| 2002/0019763 A1 | 2/2002 | Linden | |
| 2006/0288023 A1 * | 12/2006 | Szabo | 707/100 |
| 2007/0156677 A1 * | 7/2007 | Szabo | 707/5 |
| 2007/0168357 A1 | 7/2007 | Mo | |
| 2009/0300547 A1 * | 12/2009 | Bates et al. | 707/5 |
| 2012/0030062 A1 | 2/2012 | Stauffer | |
| 2012/0066072 A1 * | 3/2012 | Kanigsberg et al. | 707/749 |
| 2012/0109966 A1 * | 5/2012 | Liang et al. | 707/740 |
| 2012/0130819 A1 | 5/2012 | Willcock | |
| 2012/0215639 A1 * | 8/2012 | Ramer et al. | 705/14.53 |
| 2012/0254188 A1 * | 10/2012 | Koperski et al. | 707/740 |
| 2012/0296926 A1 | 11/2012 | Kalin | |
| 2013/0007124 A1 * | 1/2013 | Sweeney et al. | 709/204 |
| 2013/0091450 A1 | 4/2013 | Yi | |
| 2013/0317941 A1 * | 11/2013 | Stoll et al. | 705/26.35 |

* cited by examiner

*Primary Examiner* — Rehana Perveen
*Assistant Examiner* — Tiffany Thuy Bui
(74) *Attorney, Agent, or Firm* — Bryan Cave LLP

(57) ABSTRACT

Disclosed are methods for inferring interests of a user based on declared interests of the user. Text for which a user has expressed interest, e.g. "liked" is evaluated to identify at least one principal concept. A principal article for the principal concept is located in a taxonomy and the link structure of the taxonomy analyzed to identify candidate articles related to the principal article. The candidate articles are scored according to a plurality of metrics and these scored are weighted and combined for a final score. Candidate articles are selected for the score and recommendations are generated and recommendations generated based on the concepts of the selected candidate articles.

23 Claims, 4 Drawing Sheets

INTEREST EXPANSION USING A TAXONOMY

BACKGROUND

1. Field of the Invention

This invention relates to systems and methods for inferring likely interests of a user based on interests declared by the user.

2. Background of the Invention

There are many ways for a user to express interest in products and content. Facebook™ provides "like" and "dislike" functions that a user can invoke with respect to online content and products. Many merchants allow users to review products. In many ways this input from a user is only of benefit to others—they will see the expressions of interests and choose whether or not to purchase products or otherwise consume media content.

Accordingly, what is needed is an approach to infer products or areas of interest that have a high probability of being of interest to a user based on declared interests in order to help a user find products and content likely to be of interest.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
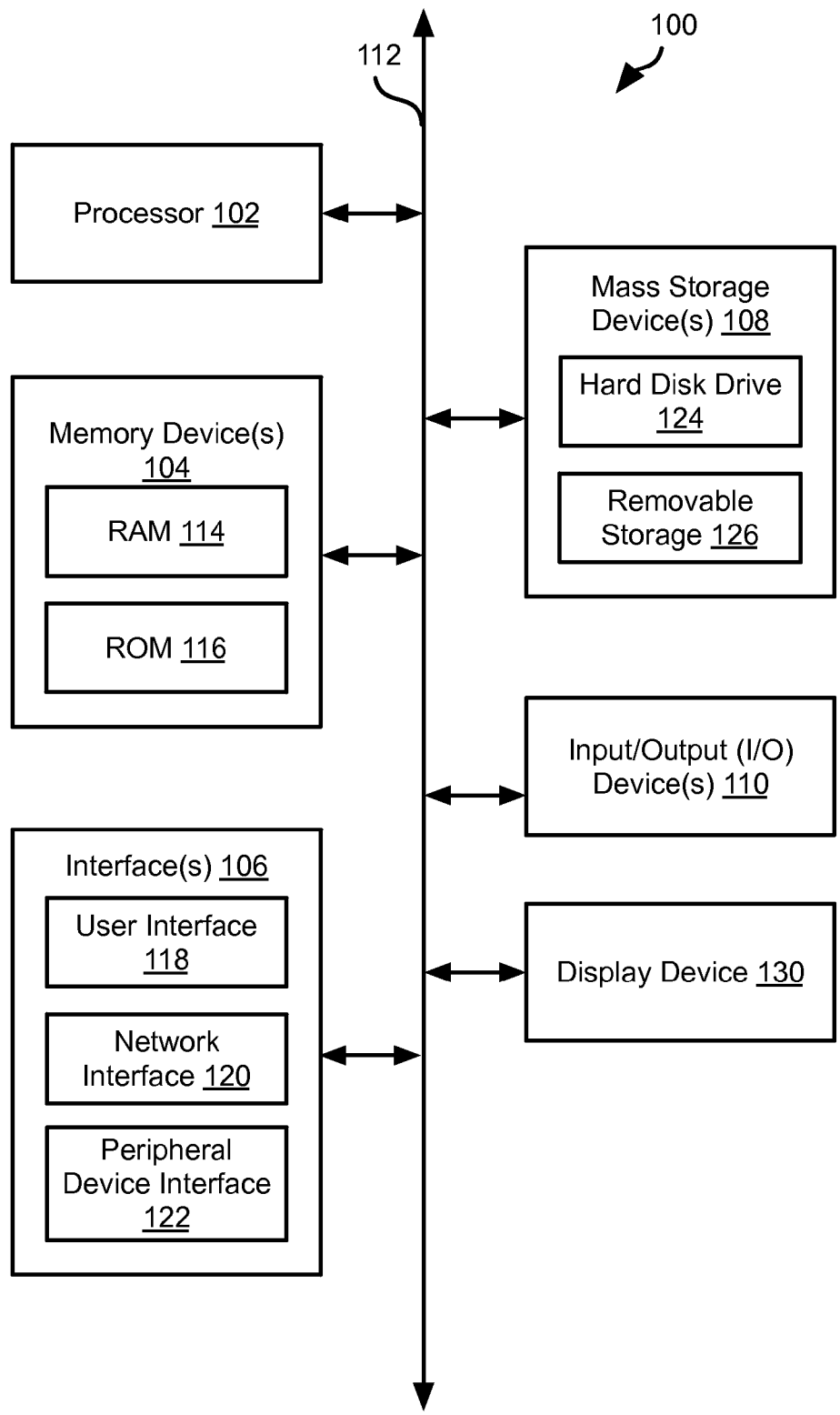
FIG. 1 is a block diagram of a computing device suitable for implementing embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In particular, the invention has been developed to provide apparatus and methods for inferring likely interests of a user based on interests declared by the user.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
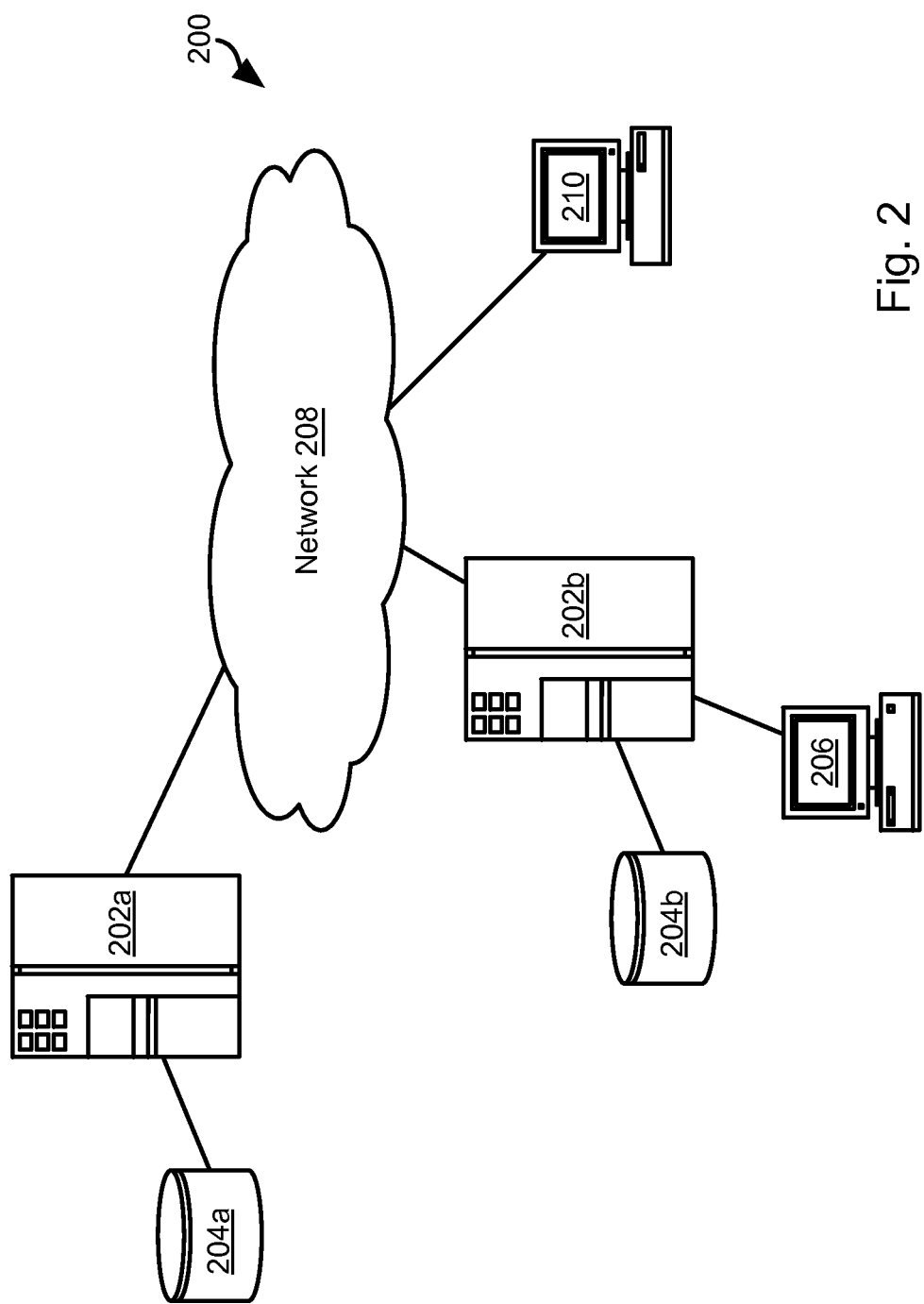
FIG. 2 is a block diagram of a network environment suitable for implementing embodiments of the present invention.

FIG. 2 illustrates an example of a computing environment 200 suitable for implementing the methods disclosed herein. In some embodiments, a server 202a provides access to a database 204a in data communication therewith. The database 204a may store a directed graph. For example, the database 204a may store the Wikipedia™ corpus or some other corpus of documents hyperlinked to one another to define a directed graph. The server 202a may provide access to the database 204a to various users. For example, the server 202a may implement a web server for receiving requests for data stored in the database 204a and formatting requested information into web pages. The web server may additionally be operable to receive information and store the information in the database 204a. Although a single database 204a and server 202a are shown, the data accessed by users may be distributed across multiple databases 204a and accessed by means of multiple servers 202a.

A server 202b may be associated with another entity providing information services, such as responses to queries for information. The server 202b may be in data communication with a database 204b. The database 204b may store information for use in implementing methods described herein. In particular, the database 204b may store a taxonomy obtained through a transformation of the directed graph from the databases 204a, such as according to the methods described in application Ser. No. 13/622,975, filed Sep. 19, 2012, and entitled TRANSFORMING A GRAPH TO A TREE IN ACCORDANCE WITH ANALYST GUIDANCE, which is hereby incorporated herein by reference in its entirety. As described in this application, a taxonomy may be generated that groups entities under categories according to "is a" relationships. In some embodiment, both the directed graph and taxonomy are generated by the same entity and stored and accessed using the same hardware. An operator may access the server 202*b* by means of a workstation 206, that may be embodied as any general purpose computer, tablet computer, smart phone, or the like.

The server 202*a* and server 202*b* may communicate with one another over a network 208 such as the Internet or some other local area network (LAN), wide area network (WAN), virtual private network (VPN), or other network. A user may access data and functionality provided by the servers 202*a*, 202*b* by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202*a*-202*b*, and databases 204*a*, 204*b* may have some or all of the attributes of the computing device 100.

Figure 3:
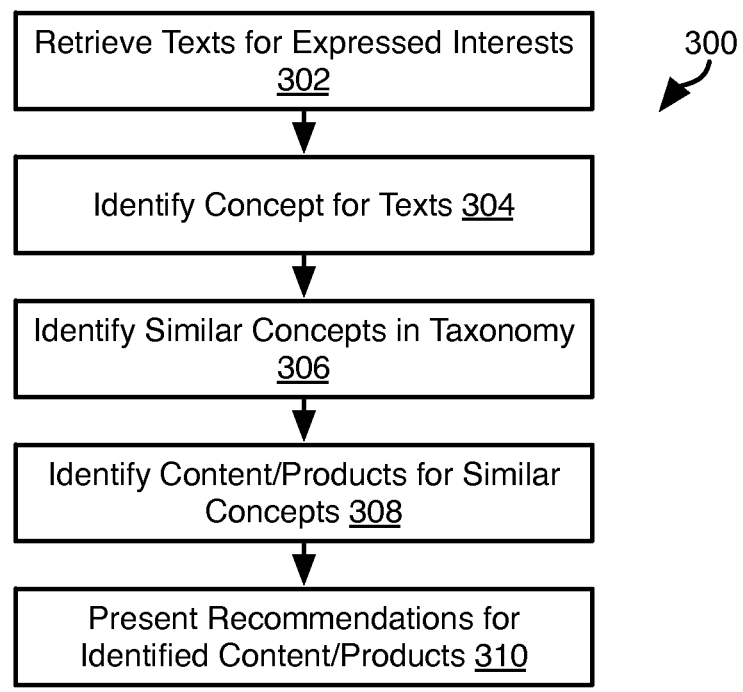
FIG. 3 is a process flow diagram of a method for generating an expanded set of interests based on declared interests of a user in accordance with an embodiment of the present invention.

FIG. 3 illustrates a method 300 for inferring interests for a user based on declared interests of a user. Declared interests of a user may be identified by analyzing social media content of a user such as Twitter™, Facebook™, or the like. The methods described herein may be invoked by a user or with the user's permission. Interests of a user may be represented by some sort of text, such as a document, web page, "tweet" on Twitter™, media content, or the like. Interest may be detected by means of detecting approving words in a post or tweet that references (e.g. links) to a text. Interest may also be detected by means of detecting a "like" on Facebook™ associated with the text. The words indicating approval of a text and the text that described a user's interest may be included in the same document.

The texts as described above in which a user has expressed interest may be retrieved 302. The text may be evaluated to identify 304 one or more concepts that are the focus of the text. Methods used to identify the concept may include any method known in the art for mapping text to a concept. For example, one or more concepts may be extracted according to the methods described in U.S. patent application Ser. No. 13/300,524, entitled "PROCESSING DATA FEEDS," filed Nov. 18, 2011, which is hereby incorporated herein by reference in its entirety. In some embodiments, the concept may be extracted by submitting the text as a query to a method that answers the question "what is it?," such as the methods described in U.S. patent application Ser. Nos. 13/630,325; 13/630,345; and 13/630,369, entitled "ESTABLISHING 'IS A' RELATIONSHIPS FOR A TAXONOMY," filed Sep. 28, 2012, which are hereby incorporated herein by reference in its entirety. Similar concepts to the concept may be identified 306 and content, products, or the like, corresponding to the original concept and the similar concepts may be identified 308 and presented 310, or transmitted for presentation, to a user.

Figure 4:
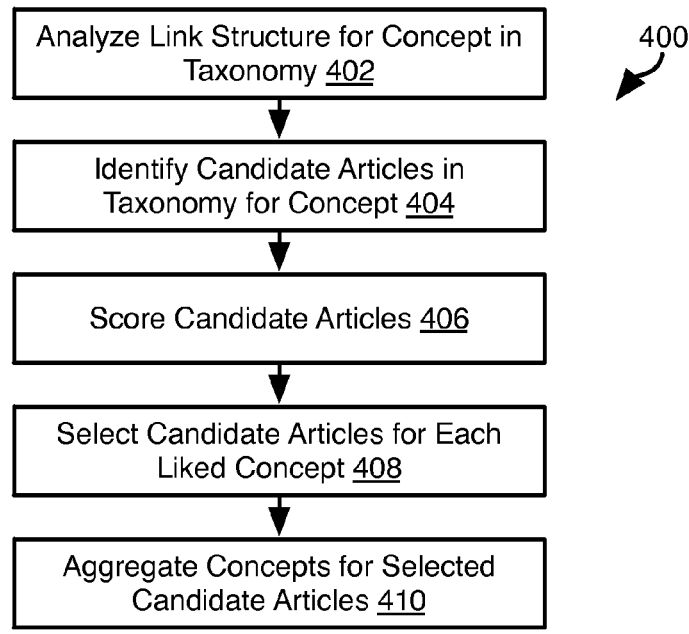
FIG. 4 is a process flow diagram of a method for identifying concepts of likely interests in a taxonomy based on declared interests of a user in accordance with an embodiment of the present invention.

FIG. 4 illustrates a method 400 for identifying similar concepts for an original concept in which a user is found to have expressed interest. The method 400 may take as an input a concept for which a user is found to have expressed interests as described above. The method 400 may additionally use a taxonomy that organizes concepts in a hierarchical manner. For example, a taxonomy that classifies concepts according to "is a" relationships may be used, such as a taxonomy generated from an undirected graph using the methods of U.S. application Ser. No. 13/622,975. The nodes of the taxonomy that include articles containing a description of the classifier or entity represented by the node. For example, the articles may be Wikipedia™ articles for concepts of the taxonomy.

The method 400 may include identifying an article in the taxonomy corresponding to a concept identified as of interest to a user, hereinafter the "principal article" and "principal concept," respectively. The link structure relating the principal article may be analyzed 402 and candidate articles in the taxonomy may be identified 404. Identifying 404 a plurality of candidate articles may include identifying articles that satisfy one or more of the following conditions linking to the principal article, being linked to by the principal article, having a common parent (e.g. immediate parent) in the taxonomy as the principal article. In some instances, a corpus that is not structured as a strict hierarchical taxonomy may be used. In such embodiments, a principal article may have more than one category parents. In some embodiments, articles that are descendants (both category concepts and non-category concepts) of the principal article may also be selected as candidate articles. In some embodiments, candidate articles may be selected from ancestors or descendants of the principal article that are not immediate parents or descendants, respectively. Likewise, in addition to articles to which a principal article links to or to which the principal article links, articles that link to or are linked to by one of these articles may be selected as candidate articles in some embodiments.

The candidate articles may be scored 406 according to a likelihood that the candidate concept represented by the candidate article will be of interest to the user. A subset of the candidate articles may be selected 408 based on these scores. For example, candidate articles with scores above a threshold or the candidate articles with the top N scores may be selected. The concepts corresponding to the selected candidate articles may be aggregated and used to make recommendations for products, media content, and the like. In some embodiments, aggregating 410 concepts may include aggregating groups of candidate concepts each corresponding to one of a plurality of principal concepts derived from a plurality of texts in which a user has expressed interests. Multiple principal concepts may be extracted from a single text.

Figure 5:
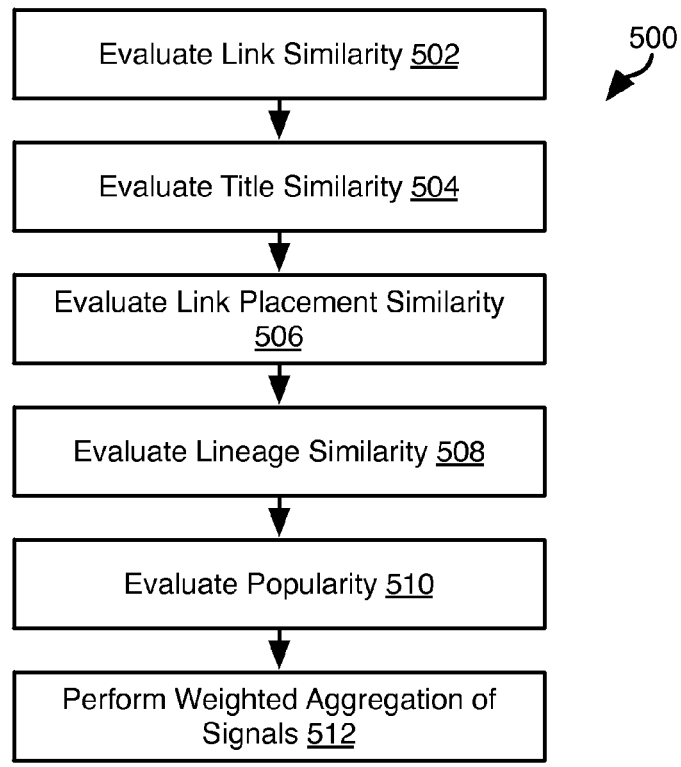
FIG. 5 is a process flow diagram of a method for evaluating an article in a taxonomy for relatedness to a declared interest of a user.

FIG. 5 illustrates a method 500 for scoring 406 candidate articles to indicate the likelihood that the concepts associated therewith will be of interests to the user. As shown in FIG. 5, the method 500 may include some or all of evaluating 502 link similarity, evaluating 504 title similarity, evaluating 506 link placement similarity, evaluating 508 lineage similarity, evaluating 510 popularity, and performing 512 aggregation of signals.

Evaluating link similarity may include evaluating one or both of the text that is linked, i.e. the text the user selects when navigating to a linked document, and the document that is linked. Thus, the links of principal document may be compared to the links of the candidate articles. The more links a candidate article has in common with the principal article and the more the text of the links are alike, the higher the score the candidate article will receive. Similarity of the text of links may be computed by means of any string comparison method, such as by computing a string edit distance. In some embodiments, the common links may be used to compute a Jaccard distance between the documents. For example, the Jaccard distance may be calculated according to (1), where D is the Jaccard distance, $S_1$ is the set of links in the principal article and $S_2$ is the set of links in a candidate article.

$$D = \frac{|S_1 \cap S_2|}{|S_1 \cup S_2|} \quad (1)$$

In some embodiments S1 and S2 mat be defined as a set of candidate articles. As described above, a set of candidate articles (S1) may be identified for a concept. Using the same method, a set of candidate articles (S2) may be identified for each candidate article for the principal article. The values of S1 and S2 may then be used in (1) to calculate a distance D.

Evaluating 504 title similarity may include evaluating a difference between the title of the principal article and the title of the candidate articles. Any string comparison technique may be used. For example, the "string edit distance" between the title of the principal article and a candidate article may be calculated. In some embodiments, evaluating 504 title similarity may additionally or alternatively include tokenizing titles for the principal article and a candidate article into words and the Jaccard similarity of the words included in each title may be evaluated. A string edit distance or some other similarity metric may also be calculated between some other portion of the principal and candidate articles may also be calculated.

Evaluating 506 link placement similarity may include evaluating where in the articles common links between the candidate articles and the principal article. For example, for each link found to have an identical destination in the principal article and a candidate article, a score may be incremented if the links are approximately identically placed. This may include identifying sections of articles having standardized format and augmenting the score for each identical link that is in the same section for both the candidate article and principal article.

Evaluating 508 lineage similarity may include measuring the similarity between the lineage of the candidate article a and that of principal article c. Specifically, let $\langle 1_1^a, 1_2^a, \ldots, 1_n^a \rangle$ and $\langle 1_1^c, 1_2^c, \ldots, 1_m^c \rangle$ be the lineage of a and c, respectively, where $1_i^a$ or $1_j^e$ is a concept along the path in a taxonomy, such as the wiki categorization system, from the root to the concept c. First, we assign a weight to each lineage concept l. The weight is computed as follows according to (2), where $N_l$ is the number of descendants of the lineage concept l.

$$w(l) = \frac{1}{\log 2(N_l)} \quad (2)$$

Then the similarity between the two lineages is calculated using Jaccard metric of (1) as above where $S_1$ is the lineage concepts of c and $S_2$ is the lineage concepts of a, except that instead of counting the lineage concepts, their weights $w_1$ are summed. For example, if the two weight-annotated lineages are $\langle 1_1{:}x, 1_2{:}y, 1_3{:}z \rangle$ and $\langle 1_1{:}x, 1_3{:}z, 1_4{:}w \rangle$, the similarity score is computed as (3)

$$D = \frac{(x+z)}{(w+x+y+z)} \quad (3)$$

Evaluating 508 popularity 510 may include evaluating popularity of a candidate article by evaluating a number of page requests for the candidate article. For example, Wikipedia™ publishes such statistics for the pages in the corpus. As one example, a popularity metric for a candidate article may be computed as log(a)/B, where a is the number of page requests for the candidate article over the past N days, e.g. 30, and B is a scaling value, e.g. 13.

The scores that are the result of the evaluation steps 502-510 may be weighted and summed as part of the aggregation step 512. The weights may be calculated according to logistic regression. For example, a sample of user data sets, each including a number of known interests of a user, may be evaluated by an analyst and other concepts that would be of interest may be identified by the analyst. The articles corresponding to these other concepts and some non-relevant articles in the taxonomy may be scored according to the evaluation steps 502-510. The weights may then be chosen according to logistic regression such that non-relevant articles are less likely to receive a high score and the other concepts identified as being of interest receive a high score. In some embodiments, a portion of the concepts known to be of interest to a user may be used to identify concepts and the remaining portion used to calculate weights such that the articles corresponding to the remaining portion of the concepts receive a high score relative to non-relevant concepts.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for inferring interests, the method comprising:
   receiving, by a computer system, one or more indicators of approval of from a user, each of the one or more indicators having a text corresponding thereto;
   evaluating, by the computer system, the one or more texts of the one or more indicators and identifying for the one or more texts one or more principal concepts corresponding thereto;
   for each principal concept of the one or more principal concepts:
      locating a principal article in a taxonomy corresponding to the principal concept;
      identifying candidate articles according to linking of the candidate articles relative to the principal article;
      evaluating similarity of the candidate articles to the principal article; and
      selecting at least one of the candidate articles according to the similarity;
   generating, by the computer system, recommendations for the user in accordance with concepts associated with the at least one of the candidate articles for each of the principal concepts; and
   transmitting, by the computer system, for display to the user, the recommendations;
   wherein evaluating the similarity of the candidate articles to the principal article further comprises evaluating a lineage similarity of the candidate articles to the principal article; and
   wherein the lineage similarity of the candidate articles to the principal article is calculated according to a weighted Jaccard distance between ancestors of the principal article and ancestors of the candidate articles, each ancestor of the principal article and each ancestor of the candidate articles being weighted according to a number of descendants of the each ancestor in the taxonomy including the ancestors of the principal article and the candidate articles.

2. The method of claim 1, wherein identifying candidate articles according to linking of the candidate articles relative to the principal article further comprises identifying as candidate articles those articles in the taxonomy that include links to the principal article and articles in the taxonomy to which the principal article includes links.

3. The method of claim 2, wherein identifying candidate articles according to linking of the candidate articles relative to the principal article further comprises identifying as candidate articles those articles having a same category parent in the taxonomy as the principal article.

4. The method of claim 2, wherein identifying candidate articles according to linking of the candidate articles relative to the principal article further comprises identifying as candidate articles those articles having a same immediate category parent in the taxonomy as the principal article.

5. The method of claim 1, wherein evaluating similarity of the candidate articles to the principal article further comprises evaluating similarity of titles of the candidate articles to a title of the principal article.

6. The method of claim 1, wherein evaluating similarity of the titles of the candidate articles to the title of the principal article further comprises evaluating an edit distance between the titles of the candidate articles and the title of the principal article.

7. The method of claim 1, wherein evaluating similarity of the candidate articles to the principal article further comprises evaluating similarity of out-links of the principal article and the candidate articles.

8. The method of claim 7, wherein evaluating similarity of out-links of the principal article and the candidate articles further comprises evaluating similarity of both link text and link destination for the out-links of the principal article and the candidate articles.

9. The method of claim 7, wherein evaluating similarity of out-links of the principal article and the candidate articles further comprises evaluating similarity of placement of the out-links of the principal article and the candidate articles.

10. The method of claim 7, wherein evaluating similarity of out-links of the principal article and the candidate articles further comprises evaluating a Jaccard distance between the out-links of the principal article and the candidate articles.

11. The method of claim 1, wherein evaluating similarity of the candidate articles to the principal article further comprises evaluating a score for each candidate article relative to the principal article, the score for each candidate article computed as a weighted combination of:
   an edit distance between titles of the candidate article and a title of the principal article;
   a Jaccard distance between out-links of the principal article and the out-links of the candidate article;
   a popularity of the candidate article;
   and
   a placement similarity between out-links of the principal article and the out-links of the candidate article.

12. The method of claim 1, wherein weighting each ancestor comprises weighting the each ancestor by $1/\log2(N)$, where N is the number of descendants of the each ancestor.

13. A system for inferring interests, the system comprising one or more processors and one or more memory devices operably coupled to the one or more processors, the one or more memory devices storing executable and operational data effective to cause the one or more processors to:
   receive one or more indicators of approval of from a user, each of the one or more indicators having a text corresponding thereto;
   evaluate the one or more texts of the one or more indicators and identifying for the one or more texts one or more principal concepts corresponding thereto;
   for each principal concept of the one or more principal concepts:
      locate a principal article in a taxonomy corresponding to the principal concept;
      identify candidate articles according to linking of the candidate articles relative to the principal article;
      evaluate similarity of the candidate articles to the principal article; and
      select at least one of the candidate articles according to the similarity;
   generate recommendations for the user in accordance with concepts associated with the selected at least one of the candidate articles for each of the one or more principal concepts; and
   transmit for display to the user, the recommendations;
   wherein the executable and operational data are further effective to cause the one or more processors to evaluate similarity of the candidate articles to the principal article by evaluating a lineage similarity of the candidate articles to the principal article; and
   wherein the executable and operational data are further effective to cause the one or more processors to calculate the lineage similarity of the candidate articles to the principal article according to a weighted Jaccard distance between ancestors of the principal article and ancestors of the candidate articles, each ancestor of the principal article and each ancestor of the candidate articles being weighted according to a number of descendants of the each ancestor in the taxonomy including the ancestors of the principal article and the candidate articles.

14. The system of claim 13, wherein the executable and operational data are further effective to cause the one or more processors to identify candidate articles according to linking of the candidate articles relative to the principal article by identifying as candidate articles those articles in the taxonomy that include links to the principal article and articles in the taxonomy to which the principal article includes links.

15. The system of claim 14, wherein the executable and operational data are further effective to cause the one or more processors to identify candidate articles according to linking of the candidate articles relative to the principal article by identifying as candidate articles those articles having a same category parent in the taxonomy as the principal article.

16. The system of claim 14, wherein the executable and operational data are further effective to cause the one or more processors to identify candidate articles according to linking of the candidate articles relative to the principal article by identifying as candidate articles those articles having a same immediate category parent in the taxonomy as the principal article.

17. The system of claim 13, wherein the executable and operational data are further effective to cause the one or more processors to evaluate similarity of the candidate articles to the principal article by evaluating similarity of titles of the candidate articles to a title of the principal article.

18. The system of claim 13, wherein the executable and operational data are further effective to cause the one or more processors to evaluate similarity of the titles of the candidate articles to the title of the principal article by evaluating an edit distance between the titles of the candidate articles and the title of the principal article.

19. The system of claim 13, wherein the executable and operational data are further effective to cause the one or more processors to evaluate similarity of the candidate articles to the principal article by evaluating similarity of out-links of the principal article and the candidate articles.

20. The system of claim 19, wherein the executable and operational data are further effective to cause the one or more processors to evaluate similarity of out-links of the principal article and the candidate articles by evaluating similarity of both link text and link destination for the out-links of the principal article and the candidate articles.

21. The system of claim 19, wherein the executable and operational data are further effective to cause the one or more processors to evaluate similarity of out-links of the principal article and the candidate articles by evaluating similarity of placement of the out-links of the principal article and the candidate articles.

22. The system of claim 19, wherein the executable and operational data are further effective to cause the one or more processors to evaluate similarity of out-links of the principal article and the candidate articles by evaluating a Jaccard distance between the out-links of the principal article and the candidate articles.

23. The system of claim 13, wherein the executable and operational data are further effective to cause the one or more processors to evaluate similarity of the candidate articles to the principal article by evaluating a score for each candidate article relative to the principal article, the score for each candidate article computed as a weighted combination of:
- an edit distance between titles of the candidate article and a title of the principal article;
- a popularity of the candidate article;
- a Jaccard distance between out-links of the principal article and the out-links of the candidate article; and
- a placement similarity between out-links of the principal article and the out-links of the candidate article.

\* \* \* \* \*